United States Patent [19]
Allcock

[11] 3,888,800
[45] June 10, 1975

[54] PREPARATION OF PHOSPHAZENE POLYMERS

[75] Inventor: Harry Rex Allcock, State College, Pa.

[73] Assignee: The Firestone Tire & Rubber Company, Akron, Ohio

[22] Filed: Oct. 13, 1971

[21] Appl. No.: 188,440

[52] U.S. Cl............. 260/2 P; 260/927 N; 260/982; 423/300
[51] Int. Cl...................... C08f 13/00; C08g 25/00
[58] Field of Search.................. 260/2 P, 982, 927 N

[56] References Cited
UNITED STATES PATENTS

| | | | |
|---|---|---|---|
| 2,875,230 | 2/1959 | Coover et al. | 260/982 |
| 3,083,224 | 3/1963 | Brace et al. | 260/92 |
| 3,271,330 | 9/1966 | Evans | 260/2 |
| 3,515,688 | 6/1970 | Rose | 260/2 |
| 3,524,907 | 8/1970 | Stockel et al. | 260/927 |

OTHER PUBLICATIONS

Audrieth, et al., "Chemical Reviews," Vol. 32, (1943), pp. 109–133, p. 130.
Hoffman, et al., "Jour. American Chemical Society," Vol. 78 (Nov. 1956), pp. 5817–5812.

*Primary Examiner*—Wilbert J. Briggs, Sr.

[57] ABSTRACT

Poly(phosphazenes) the skeletal chain of which comprises recurring units represented by the formula

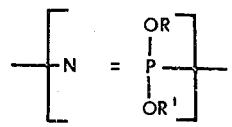

containing a readily controlled ratio of R to R' are prepared by first preparing a homopolymer the skeletal chain of which comprises recurring units represented by the general formula

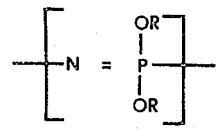

and then utilizing a ligand exchange process between the homopolymer and ligands of another type. The groups OR and OR' are preferably selected from $F(CF_2)_a CH_2 O-$ and $H(CF_2)_b CH_2 O-$ wherein $a$ and $b$ are small integers not greater than 9.

1 Claim, No Drawings

PREPARATION OF PHOSPHAZENE POLYMERS

This invention relates to the preparation of phosphazene copolymers. More particularly, it relates to the preparation of such copolymers with more readily controlled composition of the side groups in the copolymer.

The preparation of phosphazene homopolymers by reaction of polymerized $PNCl_2$ with various alkoxides is taught in U.S. Pats. to Allcock, et al. No. 3,370,020 and to Rose, No. 3,515,688, and elsewhere in the literature.

The properties of the homopolymers are excellent for certain uses, but are less satisfactory for other purposes and as a consequence, copolymers with randomly distributed units have been proposed in the aforementioned patent to Rose.

The present invention is directed to an improved method of preparation of such copolymers and to the copolymers so produced.

Briefly, the procedure of the present invention comprises the following:

1. Preparation and polymerization of $(PNCl_2)_n$ by any suitable means known in the art.
2. Reaction of the chloropolymer with a suitable alkoxide to produce a homopolymer with two identical groups attached to each phosphorus atom in a polymer, the skeletal chain of which comprises recurring units represented by the general formula

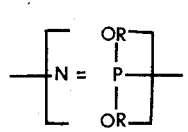

3. Further reaction of the homopolymer with a different ligand OR' results in a ligand exchange process whereby a selected number of groups OR are replaced by groups OR', resulting in formation of a copolymer in which the structure and composition is more readily controlled than in previously disclosed methods for producing copolymers.

Conventional methods of producing copolymers utilize the reaction of mixtures of alkoxides with the poly(chlorophosphazene) which can result in copolymers having structures and properties dependent on the relative reactivities of the alkoxides with the chloropolymer. The relative reactivities depend both on steric and electronic factors of the entering ligand. By proper choice of ligands, the present method can be used to produce copolymers of controlled structures and hence more desirable physical properties.

EXAMPLE 1

A solution of sodium 2,2,3,3,4,4,4-heptafluorobutoxide (I) in tetrahydrofuran (THF) was prepared by reacting 3.00 g (0.015 mole) 2,2,3,3,4,4,4-heptafluorobutanol and 0.35 g (0.015 mole) sodium in dry THF. After the sodium had disappeared, this solution was added to a stirred solution of poly[bis(trifluoroethoxy)phosphazene] (II) (2.43 g., 0.010 mole) in dry THF (20 ml.) at 25°C. The mixture was then refluxed for four hours. After cooling, the polymer was precipitated into cold water (2000 ml.), washed with water, and reprecipitated from Freon TA into heptane by pressure filtration through a millipore filter. The resulting polymer was elastomeric.

Treatment of the polymer II with an equimolar amount of the sodium salt I yielded a copolymer which was a gum.

EXAMPLE 2

A solution of poly bis(trifluoroethoxy)phosphazene (5.82 g., 0.024 mole) in dry THF (200 ml.) was treated with a solution prepared from 2,2,3,3,3-pentafluoropropanol (3.62 g., 0.024 mole) and sodium (0.55 g, 0.024 mole) in THF (100 ml.) in the same manner as above. The resulting copolymer was flexible, but not elastomeric.

EXAMPLE 3

To a solution of sodium 2,2,3,3,4,4,5,5-octafluoropentoxide prepared from 30.0 g. (0.129 mole) of 2,2,3,3,4,4,5,5-octafluoropentanol and 2.8 g. (0.121 mole) of sodium in 500 ml of THF there was added 30 g. (0.123 mole) of $[NP(OCH_2CF_3)_2]_n$ with stirring over a period of five minutes. The mixture was stirred at reflux under nitrogen for 60 hours.

The solvent (THF) was removed under vacuum and the residue was washed with isopropanol-$H_2O$ mixture. The polymer was dissolved in acetone from which it was precipitated by the addition of water.

The resulting elastomeric polymer was found to have a ratio of $[OCH_2CF_3]$ to $[OCH_2(CF_2)_3CF_2H]$ of 1:1 and a Tg of −62°C.

I claim:

1. A process for preparing polyphosphazenes consisting of a skeletal chain composed of recurrring units represented by the general formula:

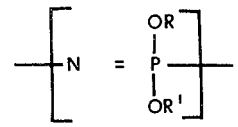

wherein each of OR and OR' represents a monovalent radical selected from the group consisting of $-OCH_2(CF_2)_aCF_2F$ and $-OCH_2(CF_2)_bH$ and wherein R and R' are different from each other, and wherein $a$ and $b$ are small integers between 0 and 9, which process comprises:

1. preparing homopolymers consisting of a skeletal chain composed of recurring units represented by the general formula:

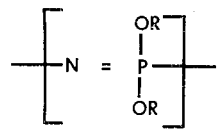

in which R has the meaning given above; and
2. effecting replacement of some of the OR radicals in said homopolymer by radicals of the OR' type by reacting said homopolymer with an alkoxide containing said OR' radical, the radicals OR and OR' being as defined above and being different from each other, whereby the resulting polyphosphazene possesses a desired distribution of OR and OR' radicals attached to the P atoms along the —P=N— backbone.

* * * * *